ized Patent

(12) United States Patent
Nakagawa et al.

(10) Patent No.: US 9,989,084 B2
(45) Date of Patent: Jun. 5, 2018

(54) SLIDE BEARING

(71) Applicant: OILES CORPORATION, Tokyo (JP)

(72) Inventors: Noboru Nakagawa, Fujisawa (JP); Kazuhiko Akeda, Fujisawa (JP)

(73) Assignee: OILES CORPORATION, Tokyo (JP)

( * ) Notice: Subject to any disclaimer, the term of this patent is extended or adjusted under 35 U.S.C. 154(b) by 0 days. days.

(21) Appl. No.: 15/548,192

(22) PCT Filed: Jan. 13, 2016

(86) PCT No.: PCT/JP2016/050860
§ 371 (c)(1),
(2) Date: Aug. 2, 2017

(87) PCT Pub. No.: WO2016/125547
PCT Pub. Date: Aug. 11, 2016

(65) Prior Publication Data
US 2018/0017100 A1    Jan. 18, 2018

(30) Foreign Application Priority Data

Feb. 3, 2015  (JP) .................................. 2015-019764

(51) Int. Cl.
*F16C 33/20*    (2006.01)
*F16C 17/02*    (2006.01)
*F16C 33/22*    (2006.01)

(52) U.S. Cl.
CPC ............ *F16C 17/02* (2013.01); *F16C 33/201* (2013.01); *F16C 33/22* (2013.01); *F16C 2326/01* (2013.01)

(58) Field of Classification Search
CPC .......... F16C 17/02; F16C 33/20; F16C 33/22; F16C 33/201; F16C 2326/01
See application file for complete search history.

(56) References Cited

U.S. PATENT DOCUMENTS 4,208,075 A  *  6/1980  Templeton .............. F16C 29/02
                                                        384/29
4,790,672 A  *  12/1988  Komplin ................. F16C 27/02
                                                        384/125
(Continued)

FOREIGN PATENT DOCUMENTS

JP    2004-183780    7/2004
JP    2008-151289    7/2008
(Continued)

OTHER PUBLICATIONS

International Search Report for PCT/JP2016/050860, dated Apr. 12, 2016, 5 pages.

*Primary Examiner* — Thomas R Hannon
(74) *Attorney, Agent, or Firm* — Nixon & Vanderhye P.C.

(57) ABSTRACT

A slide bearing which can be manufactured at low cost is provided. The slide bearing (1) is provided with a cylindrical bearing main body (2) into which a shaft member is inserted, and an elastic ring (3) for urging the bearing main body (2) diametrically inward, the elastic ring (3) being mounted to the bearing main body (2). The bearing main body (2) has a sliding surface (21) which slides against the outer peripheral surface of the inserted shaft member, a plurality of first slits (25) running along the direction of an axis O from one end surface (23) toward another end surface (24), a plurality of second slits (26) running along the direction of the axis O from the other end surface (24) toward the one end surface (23), a plurality of first elastic ring interlocking parts (27) protruding diametrically outward at one end part (220) of the outer peripheral surface (22), and a plurality of second elastic ring interlocking parts (28) protruding diametrically outward at another end part (221) of the outer peripheral surface (22). The first elastic ring interlocking parts (27) and the second elastic ring interlocking parts (28) are positioned (Continued)

(A)                   (B)                   (C)

so as not to overlap each other seen in an imaginary plane P perpendicular to the axis O.

4 Claims, 3 Drawing Sheets

(56) References Cited

U.S. PATENT DOCUMENTS

| | | | | |
|---|---|---|---|---|
| 6,485,180 B2* | 11/2002 | Mena | ............. | B62D 3/12 |
| | | | | 384/215 |
| 7,665,747 B2* | 2/2010 | Arlt | ............. | B62D 3/12 |
| | | | | 280/93.514 |
| 8,272,785 B2* | 9/2012 | Hirose | ............. | B62D 3/12 |
| | | | | 384/215 |
| 8,944,689 B2* | 2/2015 | Tange | ............. | B62D 3/12 |
| | | | | 384/215 |

FOREIGN PATENT DOCUMENTS

| | | |
|---|---|---|
| JP | 2010-164126 | 7/2010 |
| JP | 4940931 | 5/2012 |
| JP | 2013-79023 | 5/2013 |
| JP | 2013-142451 | 7/2013 |

\* cited by examiner

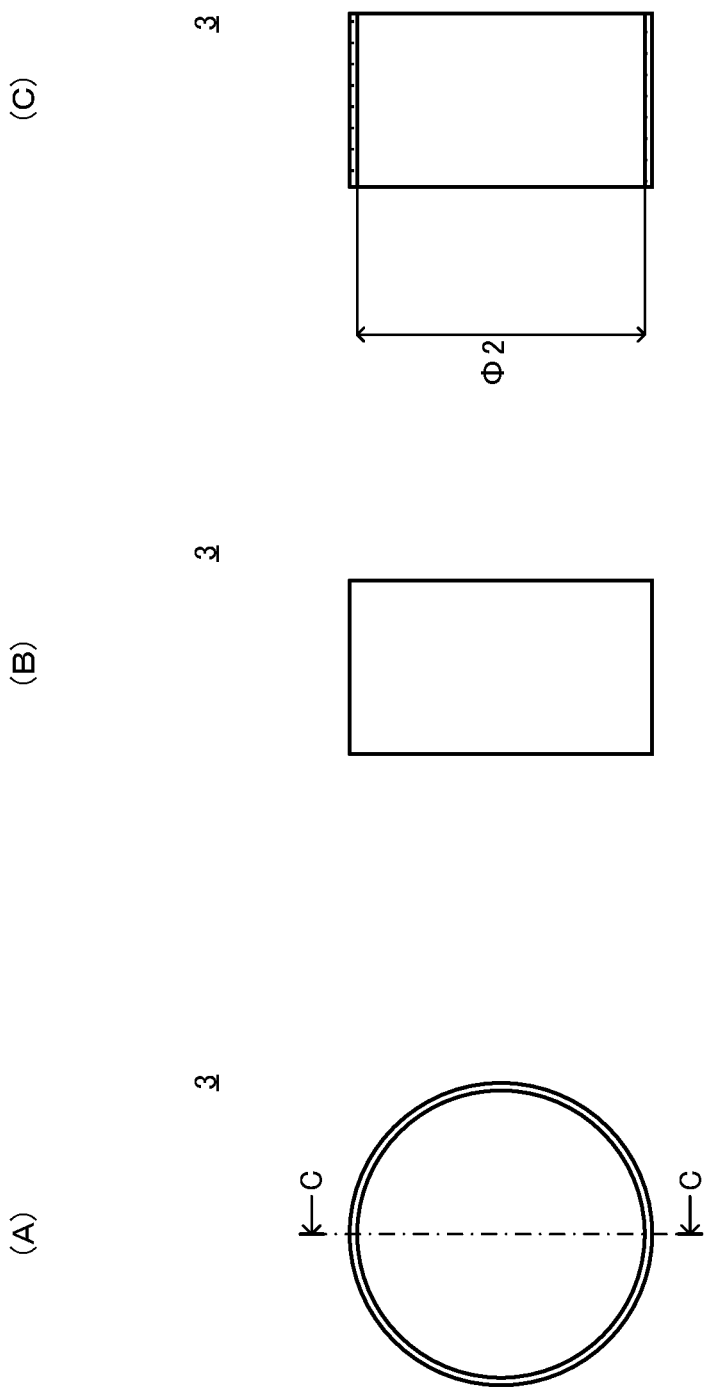

SLIDE BEARING

This application is the U.S. national phase of International Application No. PCT/JP2016/050860 filed 13 Jan. 2016, which designated the U.S. and claims priority to JP Patent Application No. 2015-019764 filed 3 Feb. 2015, the entire contents of each of which are hereby incorporated by reference.

TECHNICAL FIELD

The present invention relates to a slide bearing which supports a load applied to a shaft member while allowing movement of the shaft member, and in particular to a slide bearing suitable to a rack bush used in a steering mechanism of a vehicle.

BACKGROUND ART

The Patent Literature 1 describes a slide bearing suitable to a rack bush which supports a load applied to a rack shaft of a steering mechanism of a vehicle while allowing linear movement of the rack shaft.

This slide bearing comprises: a bearing main body of a cylindrical shape into which a rack shaft is inserted; and an elastic ring which is mounted on the bearing main body and biases the bearing main body radially inward. The bearing main body is made of synthetic resin, and comprises: a plurality of first slits formed along the axial direction from one end surface toward the other end surface; a plurality of second slits formed along the axial direction from the other end surface toward the one end surface; and a mounting groove formed in an outer peripheral surface of the bearing main body in which the elastic ring is mounted.

Here, the first slits are positioned in one half cylinder part of the bearing main body divided by an imaginary plane which includes the axis of the bearing main body, and the second slits are positioned in the other half cylinder part of the bearing main body divided by that imaginary plane. Further, the first and second slits are formed so that the slit width in the direction parallel to the imaginary plane is constant or becomes big gradually from the inside to the outside of the half cylinder part in the direction perpendicular to the imaginary plane.

According to the slide bearing described in the Patent Literature 1, the bearing main body is contracted in diameter by the elastic ring so that the bearing main body clamps the rack shaft, and the clearance between the inner peripheral surface of the bearing main body and the outer peripheral surface of the rack shaft is reduced to zero. As a result, it is possible to prevent generation of unpleasant sound due to collision between the inner peripheral surface of the bearing main body and the outer peripheral surface of the rack shaft, and it is possible to prevent variation of friction torque caused by dimension error of the outer diameter of the rack shaft.

Further, in the slide bearing described in the Patent Literature 1, the first and second slits are formed so that the slit width in the direction parallel to the imaginary plane including the axis of the bearing main body is constant or becomes big gradually from the inside to the outside of the half cylinder part in the direction perpendicular to the imaginary plane. Therefore, the bearing main body can be molded by using an outer mold (upper mold) for the one half cylinder part of the bearing main body divided by the imaginary plane, an outer mold (lower mold) for the other half cylinder part of the bearing main body divided by the imaginary plane, and a core for forming the hollow space (the insertion hole for the rack shaft) of the bearing main body. Accordingly, it is not needed to use outer molds divided in number equal to number of the first slits and the second slits, and this reduces the production costs of the slide bearing.

CITATION LIST

Patent Literature

Patent Literature 1: Japanese Patent No. 4940931

SUMMARY OF INVENTION

Technical Problem

However, the slide bearing described in the Patent Literature 1 requires the two outer molds (the upper mold and the lower mold) and the core for molding the bearing main body. Further, the bearing main body is molded in such a way that the the imaginary plane including the axis of the bearing main body is positioned between the two outer molds. Thereby, molded goods of the bearing main body are arranged parallel to the molding surfaces of the outer molds. Accordingly, the number of the molded goods of the bearing main body, which can be taken out from the molds in one execution of molding, depends on the axial length of the bearing main body. As a result, that number becomes smaller as the axial length of the bearing main bodies is longer.

The present invention has been made considering the above situation, and an object of the present invention is to provide a slide bearing which can be manufactured at lower cost.

Solution to Problem

To solve the above problem, a tubular bearing main body to which a shaft member is to be inserted is provided with: slits which are formed along the axial direction from one end surface of the bearing main body toward other end surface; and first and second elastic body locking parts which protrude radially outward from the outer peripheral surface. Here, the first elastic body locking parts are formed on the side of one end of the outer peripheral surface and the second elastic body locking parts are formed on the side of the other end of the outer peripheral surface. Further, the first elastic body locking parts and the second elastic body locking parts are located at positions which do not overlap each other seen in an imaginary plane perpendicular to the axis. An elastic body which biases the bearing main body radially inward is mounted between the first elastic body locking parts and the second elastic body locking parts.

For example, the present invention provides a slide bearing for supporting a load applied to a shaft member while allowing movement of the shaft member, comprising:

a tubular bearing main body into which the shaft member is inserted; and an elastic body which is mounted on the bearing main body and biases the bearing main body radially inward, wherein:

the bearing main body comprises:

slits which are formed along axial direction from one end surface toward other end surface;

first elastic body locking parts which are formed on a side of one end of an outer peripheral surface and protrude radially outward; and second elastic body locking parts, which are formed on a side of other end of the outer peripheral surface and protrude radially outward, and the first elastic body locking parts and the second elastic body locking parts are located at positions which do not overlap each other seen in an imaginary plane perpendicular to an axis of the bearing main body.

Advantageous Effects of Invention

According to the present invention, slits are formed along the axial direction from the one end surface toward the other end surface, and first and second elastic body locking parts protruding radially outward from the outer peripheral surface are formed so that the first elastic body locking parts and the second elastic body locking parts do not overlap each other seen in an imaginary plane perpendicular to the axis of the bearing main body. Thereby, the bearing main body can be molded, without using a core, by using two outer molds (upper mold and lower mold) which can move relatively each other in the axial direction. Further, molded goods of the bearing main body are arranged perpendicularly to the molding surfaces of the outer molds. Thereby, the number of the molded goods of the bearing main body, which can be taken out from the molds in one execution of molding, does not depend on the axial length of the bearing main body. Thus, the present invention can provide the slide bearing which can be manufactured at lower cost.

BRIEF DESCRIPTION OF DRAWINGS

FIGS. 3(A) and 3(B) are respectively a front view and a side view of an elastic ring 3, and FIG. 3(C) is a C-C cross-section view of the elastic ring 3 shown in FIG. 3(A).

DESCRIPTION OF EMBODIMENT

In the following, one embodiment of the present invention will be described.

Figure 1:
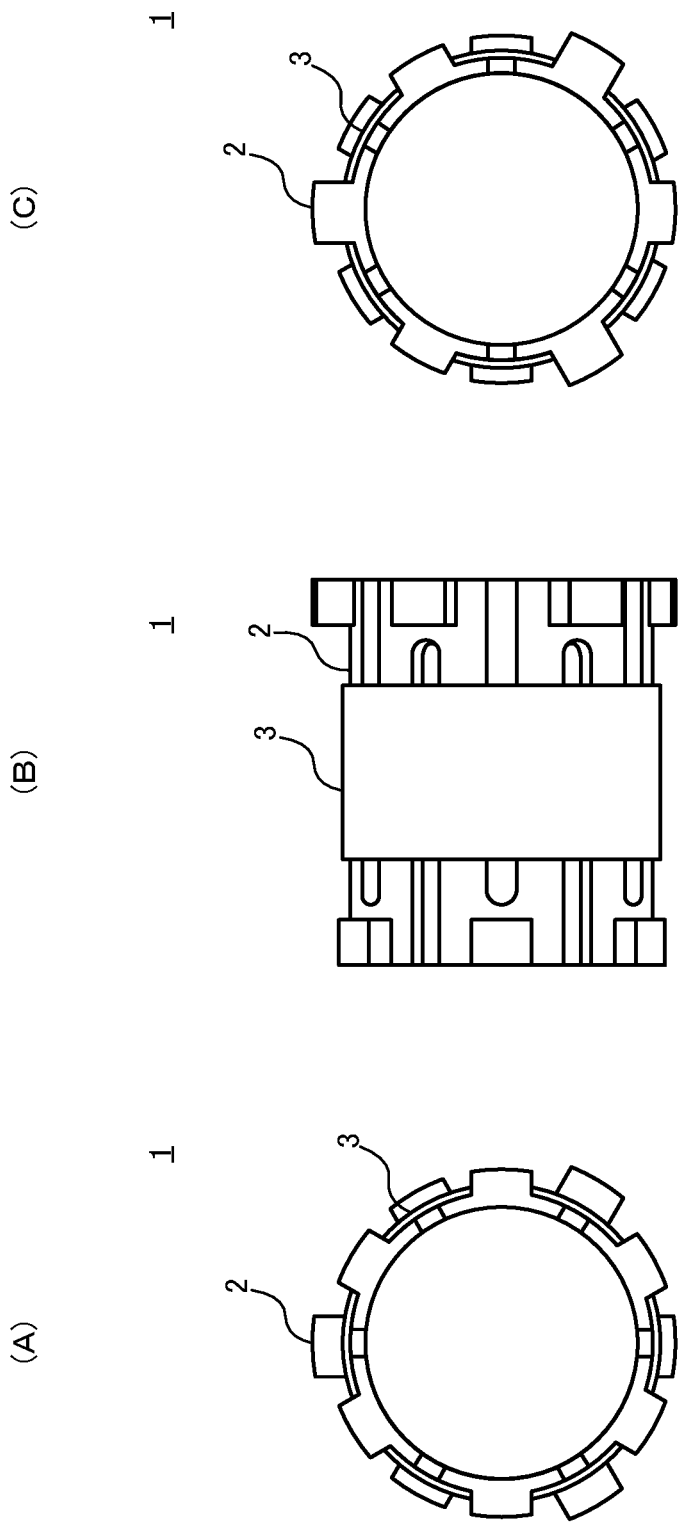
FIGS. 1(A), 1(B), and 1(C) are respectively a front view, a side view, and a back view of a slide bearing 1 according to one embodiment of the present invention.

FIGS. 1(A), 1(B), and 1(C) are respectively a front view, a side view, and a back view of a slide bearing 1 according to one embodiment of the present invention.

The slide bearing 1 of the present embodiment supports a load applied to a shaft member such as a rack shaft of a steering mechanism of a vehicle, while allowing linear movement of the shaft member. As shown in the figures, the slide bearing 1 comprises: a bearing main body 2 of a cylindrical shape into which the shaft member (not shown) is inserted; and an elastic ring 3 which biases the bearing main body 2 radially inward.

Figure 2:
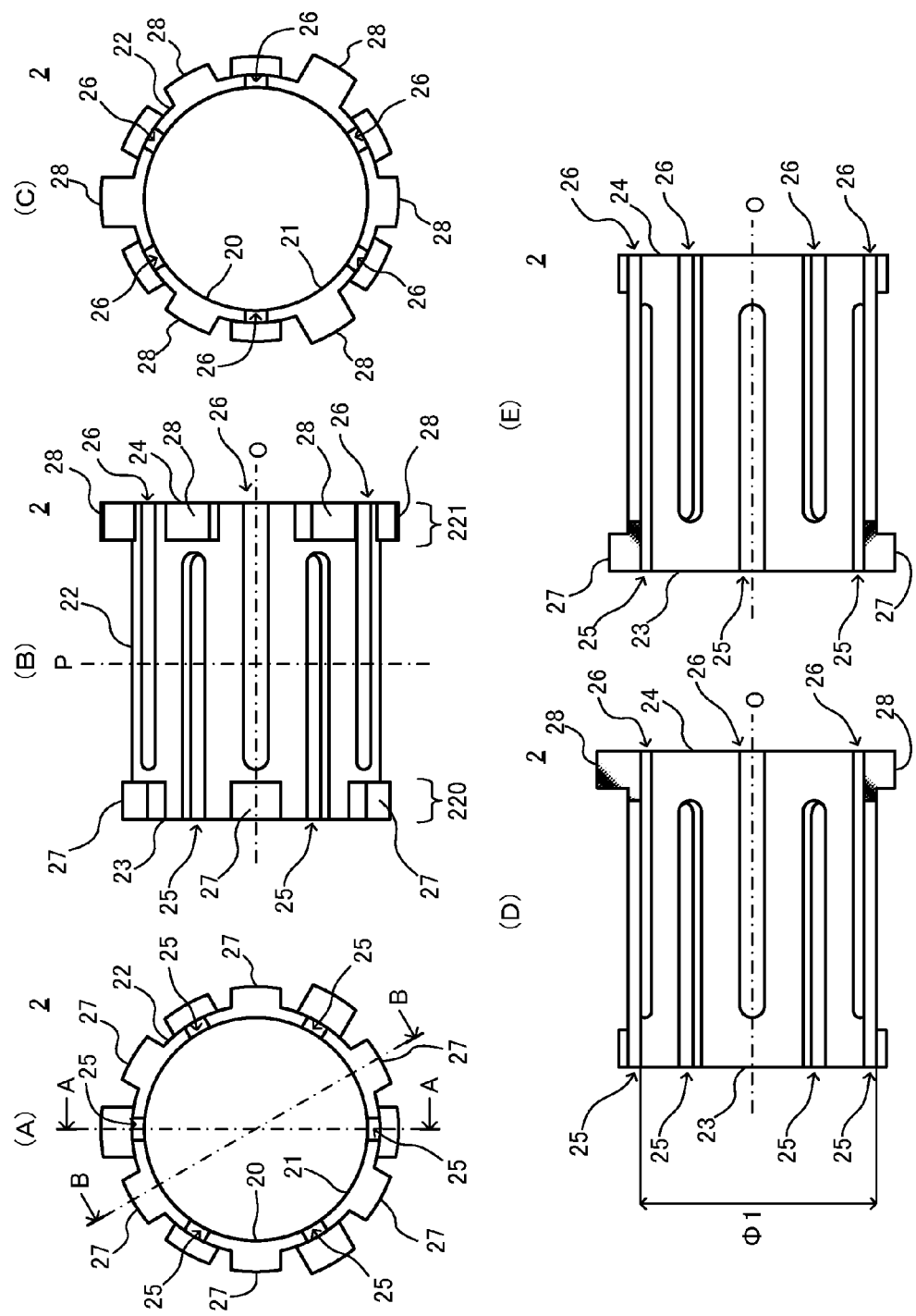
FIGS. 2(A), 2(B), and 2(C) are respectively a front view, a side view, and a back view of a bearing main body 2.
FIGS. 2(D) and 2(E) are respectively an A-A cross-section view and a B-B cross-section view of the bearing main body 2 shown in FIG. 2(A)

FIGS. 2(A), 2(B), and 2(C) are respectively a front view, a side view, and a back view of the bearing main body 2, and FIGS. 2(D) and 2(E) are respectively an A-A cross-section view and a B-B cross-section view of the bearing main body 2 shown in FIG. 2(A).

As shown in the figures, the bearing main body 2 comprises: a sliding surface 21 which is formed in the inner peripheral surface 20 and slidably contacts with an outer peripheral surface of the inserted shaft member; a plurality of first slits 25 which are formed along the direction of the axis O from one end surface 23 toward other end surface 24; a plurality of second slits 26 which are formed along the direction of the axis O from the other end surface 24 toward the one end surface 23; a plurality of first elastic ring locking parts 27 which are formed on the side of one end 220 of the outer peripheral surface 22 and protrude radially outward; and a plurality of second elastic ring locking parts 28 which are formed on the side of the other end 221 of the outer peripheral surface 22 and protrude radially outward. Here, the first elastic ring locking parts 27 and the second elastic ring locking parts 28 are located at positions which do not overlap each other seen in an imaginary plane P perpendicular to the axis O of the bearing main body 2. Namely, the first elastic ring locking parts 27 and the second elastic ring locking parts 28 are located at positions which do not overlap each other seen in the front view and the back view shown in FIGS. 2(A) and 2(C).

The bearing main body 2 is integrally molded by using synthetic resin which has excellent sliding characteristics such as polyacetal resin, polyimide resin, polyethylene resin, or tetrafluoroethylene resin.

FIGS. 3(A) and 3(B) are respectively a front view and a side view of the elastic ring 3, and FIG. 3(C) is a C-C cross-section view of the elastic ring 3 shown in FIG. 3(A).

As shown in the figures, the elastic ring 3 has a cylindrical shape, and the inner diameter φ2 of the elastic ring 3 is smaller than the outer diameter φ1 of the bearing main body 1. Accordingly, the elastic ring 3 biases the bearing main body 2 radially inward when the elastic ring 3 is mounted on the bearing main body 2. The elastic ring is formed by using elastic thermoplastic synthetic resin such as natural rubber, synthetic rubber, or polyester elastomer. Here, although the elastic ring 3 is the cylindrical shape, the elastic ring 3 may be a so-called O-ring. Further, instead of the elastic ring, another elastic body may be used as far as it can bias the bearing main body 2 radially inward Hereinabove, one embodiment of the present invention has been described.

In the slide bearing 1 of the present embodiment, the bearing main body 2 has the plurality of first slits 25 formed along the direction of the axis O from the one end surface 23 toward the other end surface 24 and the plurality of second slits 26 formed along the direction of the axis O from the other end surface 24 toward the one end surface 23. Thereby, the bearing main body 2 can be radially expanded and contracted. Since the bearing main body 2 is contracted in diameter by the elastic ring 3 mounted on the bearing main body 2 so that the shaft member inserted in the bearing main body 2 is clamped, the clearance between the sliding surface 21 formed in the inner peripheral surface 20 of the bearing main body 2 and the outer peripheral surface of the shaft member can be made zero. Accordingly, it is possible to prevent generation of unpleasant sound due to collision between the sliding surface 21 formed in the inner peripheral surface 20 of the bearing main body 2 and the outer peripheral surface of the shaft member and to prevent variation of friction torque caused by dimension error of the outer diameter of the shaft member.

Further, in the slide bearing 1 of the present embodiment, the plurality of first elastic ring locking parts 27 protruding radially outward are formed on the side of the one end 220 of the outer peripheral surface 22 of the bearing main body 2. And the plurality of second elastic ring locking parts 28 protruding radially outward are formed on the side of the other end 221 of the outer peripheral surface 22. Accordingly, the elastic ring 3 mounted between the first elastic ring locking parts 27 and the second elastic ring locking parts 28 of the bearing main body 2 is prevented from slipping off from the bearing main body 2.

Further, in the slide bearing 1 of the present embodiment, the first elastic ring locking parts 27 and the second elastic ring locking parts 28, which are formed on the outer peripheral surface 22 of the bearing main body 1, are located at positions which do not overlap each other seen in the imaginary plane P perpendicular to the axis O of the bearing main body 2. Namely, the first elastic ring locking parts 27 and the second elastic ring locking parts 28 are located at positions which do not overlap each other seen in the front view and the back view shown in FIGS. 2(A) and 2(C). Accordingly, it is possible to mold the bearing main body 2 integrally, without using a core, by using two outer molds (upper and lower molds) which can move relatively each other in the direction of the axis O of the bearing main body. In this case, it is possible to arrange molded goods of the bearing main body 2 perpendicularly to the molding surfaces of the outer molds. Thereby, the number of the molded goods of the bearing main body 2, which can be taken out from the molds in one execution of molding, does not depend on the length of each bearing main body 2 in the direction of the axis O. Thus, it is possible to provide the slide bearing 2 which can be manufactured at lower cost.

The present invention is not limited to the above-described embodiment, and can be variously changed within the scope of the invention.

For example, in the above-described embodiment, the bearing main body 2 has the plurality of first slits 25 formed along the direction of the axis O from the one end surface 23 toward the other end surface 24 and the plurality of second slits 26 formed along the axis O from the other end surface 24 toward the one end surface 23. The present invention, however, is not limited to this. It is sufficient which the bearing main body 2 has slits formed along the axis O from either of the end surfaces toward the other end surface. Further, although the shape of the bearing main body 2 is cylindrical, the bearing main body 2 may have any tubular shape which is fit to the shape of the shaft member to be inserted.

The present invention can be widely applied to a slide bearing which supports a load applied to a shaft member while allowing movement of the shaft member.

REFERENCE SIGNS LIST

1: slide bearing; 2: bearing main body; 3: elastic ring; 20: inner peripheral surface of the bearing main body 2; 21: sliding surface of the bearing main body; 22: outer peripheral surface of the bearing main body 2; 23, 24: end of the bearing main body 2; 25: first slit; 26: second slit; 27: first elastic ring locking part; 28: second elastic ring locking part; and 220, 221: end of the outer peripheral surface 22.

The invention claimed is:

1. A slide bearing for supporting a load applied to a shaft member while allowing movement of the shaft member, comprising:
   a tubular bearing main body into which the shaft member is inserted; and
   an elastic body which is mounted on the bearing main body and biases the bearing main body radially inward, wherein:
   the bearing main body comprises:
   slits which are formed along axial direction from one end surface toward other end surface;
   first elastic body locking parts which are formed on a side of one end of an outer peripheral surface and protrude radially outward; and
   second elastic body locking parts which are formed on a side of other end of the outer peripheral surface and protrude radially outward, and
   the first elastic body locking parts and the second elastic body locking parts are located at positions which do not overlap each other seen in an imaginary plane perpendicular to an axis of the bearing main body.

2. A slide bearing of claim 1, wherein:
   the bearing main body is made of synthetic resin.

3. A slide bearing of claim 2, wherein:
   the elastic body is made of rubber or elastic synthetic resin.

4. A slide bearing of claim 2, wherein:
   the elastic body is made of rubber or elastic synthetic resin.

* * * * *